US011289057B2

(12) United States Patent
Spratling, IV

(10) Patent No.: US 11,289,057 B2
(45) Date of Patent: Mar. 29, 2022

(54) MUSIC NOTATION USING A DISPROPORTIONATE CORRELATED SCALE

(71) Applicant: Benjamin Barnett Spratling, IV, Atlanta, GA (US)

(72) Inventor: Benjamin Barnett Spratling, IV, Atlanta, GA (US)

( * ) Notice: Subject to any disclaimer, the term of this patent is extended or adjusted under 35 U.S.C. 154(b) by 195 days.

(21) Appl. No.: 16/542,987

(22) Filed: Aug. 16, 2019

(65) Prior Publication Data

US 2021/0049987 A1 Feb. 18, 2021

(51) Int. Cl.

| | |
|---|---|
| ***G09B 15/00*** | (2006.01) |
| ***G10G 3/04*** | (2006.01) |
| ***G10G 1/00*** | (2006.01) |
| ***G10H 1/00*** | (2006.01) |

(52) U.S. Cl.

CPC ............. *G10G 3/04* (2013.01); *G10H 1/0008* (2013.01); *G10H 2220/011* (2013.01)

(58) Field of Classification Search

CPC ........ G10G 1/02; G09B 15/02; G09B 15/023; G09B 15/00

See application file for complete search history.

(56) References Cited

U.S. PATENT DOCUMENTS 1,796,845 A * 3/1931 Jolls .................... G09B 15/026 84/472
3,196,731 A * 7/1965 Ingley ................... G09B 15/00 84/476
7,750,224 B1 7/2010 Rav-Niv
2001/0054347 A1 12/2001 Euhara
2004/0007118 A1 1/2004 Holcombe
2004/0231494 A1 11/2004 Schifrin
2012/0216666 A1 8/2012 Fresolone
2019/0348013 A1* 11/2019 Kubita .................... G10G 1/02

OTHER PUBLICATIONS

Gardner Read, Source Book of Proposed Music Notation Reforms, 1987, pp. 11-13, 82-83, Greenwood Press, Westport, CT. Relevant excerpts attached hereto as Exhibit 1.

Thomas S. Reed, ed., "Puntun Notation," Second MNMA Conference Proceedings 1991, 1994, pp. 119-122, Notation Research Press, Kirksville, MO. Relevant excerpts attached hereto as Exhibit 2.

(Continued)

*Primary Examiner* — Daniel J Colilla
(74) *Attorney, Agent, or Firm* — Corney S. Alexander; Kent & Risley LLC

(57) ABSTRACT

Methods and systems of music notation for visually representing music that provide a visual scale representing a range of an auditory scale of a portion of a musical composition spanning at least four and a half steps. The visual scale may comprise a plurality of whole-step segments each representing one whole step in the auditory scale. Each whole-step segment may be approximately a first height. The visual scale may also comprise one or more half-step segments each representing one half step in the auditory scale. Each half-step segment may be approximately a second height. A first ratio representing the first height divided by the second height may be significantly greater than a second ratio representing the whole step divided by the half step.

18 Claims, 4 Drawing Sheets

(56) References Cited

OTHER PUBLICATIONS

Thomas S. Reed, Directory of Music Notation Proposals, Notation Research Press, 1997, pp. 6-1-6-2. Kirksville, MO. Relevant excerpts attached hereto as Exhibit 3.
Stuart Byrom, "Yet Another Simplified Notation," Google Groups, Apr. 11, 2019.Attached hereto as Exhibit 4.
Thomas Fuehringer, "Hockey Stick Notation," Google Groups, Dec. 29, 2016. Attached hereto as Exhibit 5.
Thomas Fuehringer, "Hockey Stick Notation (Fuer Elise)," Aug. 2016. Attached hereto as Exhibit 6.
Paul Morris, "Claimote SN," Oct. 2017. Attached hereto as Exhibit 7.
Music Notation Modernization Association, "Research Project." Attached hereto as Exhibit 8.
Anne Collins, Bill Collins, "Avique Notation," 1974. Attached hereto as Exhibit 9.
Rock Band, Harmonix, 2007, MTV Games. Information attached hereto as Exhibit 10.
Performous. Information attached hereto as Exhibit 11.
Lee Young, International Searching Authority, Notification of Transmittal of the International Search Report and the Written Opinion of the International Searching Authority, dated Oct. 29, 2020, pp. 1-8, Alexandria, Virginia.
Singstar. Information attached hereto as Exhibit 11.

* cited by examiner

MUSIC NOTATION USING A DISPROPORTIONATE CORRELATED SCALE

BACKGROUND

The invention relates to music notation, including a graphical method for communicating pitch, rhythm, and lyrics of a musical composition. More particularly, the invention relates to methods and displays of music notation using a disproportionate correlated scale.

The most widely used visual music notation today has no formal name; it is an evolution of "mensural" notation developed by Italian monks, which has been modified and refined over hundreds of years. Traditional music notation is so complex and unintuitive that most of its readers need years to develop even a modicum of sight-reading ability. It could loosely be referred to as "sheet music" or "modern" music notation.

The TMN staff uses a set of five lines separated by four "spaces" to capture the position of pitch. Each note in the diatonic scale, C, D, E, F, G, A, and B, is arbitrarily assigned to a successive line or space, depending on the clef. The use of a line or space for a different note is not constant between octaves, and not constant between clefs. Consequently, the use of a line or a space has no correlation to the interval between the notes as a half step or a whole step. For pitches that do not have a pre-assigned position on the staff, glyphs (such as ♯, ♮, and ♭) are drawn to indicate that the intonation should deviate from their regular pitches by a particular amount in a particular direction.

Previous attempts at new music notations. There have been several hundred documented attempts to create a music notation that is easier to learn than TMN. These many efforts generally fall into one of several categories described in well-known review texts in the field, such as "Source Book of Proposed Music Notation Reforms," Gardner Read (1987), and the *Directory of Music Notation Proposals*, compiled by Thomas S. Reed (1997), published by the Notation Research Press of Kirksville, Mo. The *Directory of Music Notation Proposals* was the conclusion of a multi-decade international research project attempting to create a new music notation. Finally, the collaborators concluded their best new notation was only marginally better than the existing TMN. The descendant of their collaboration continues today as a Google Forum, which occasionally proposes similar marginal improvements and laments failure at adoption.

Stenographic notations. In stenographic music notations, special glyphs are designed which are assigned, usually arbitrarily, to either note durations or note pitches. This category can include both numerical and alphabetic systems, which use either printed numbers or letters representing the note names. Regardless of the specific glyphs selected, the user must always pre-memorize an association of the glyph with some pitch or duration value. This renders stenographic notations (and all systems that require users to memorize the associations of glyphs with particular features) ill-suited for those without formal training.

Chromatic notations. TMN is based on the diatonic scale, which decomposes into the "Chromatic scale" comprised of 12 "half steps" in each "octave." It should be noted that musicians use a logarithmic view of pitch. In other words, they consider the "interval" between two different pitches to be the same as the interval of two other pitches if the ratios of the frequencies of two pitches in each group is the same, not the linear differences of the frequencies of the pitch. In TMN, that ratio is the twelfth root of 2; mathematically, $2^{(1/12)}$, or approximately 1.059. The result is that while a "whole step" is comprised of two "half steps," a whole step is not double the frequency difference between two pitches but $2^{(1/12)}$, or approximately 1.122.

A modern popular trend in designing new notations is to assign each half step in the chromatic scale an equal amount of vertical space on a new musical staff. Notation systems in this category differ in how many lines or spaces or dashes or colors or dots, etc., will be used.

However, all such chromatic notation systems are doomed before they begin. As one of ordinary skill in the art would recognize, the term "western scale" includes the seven-note diatonic scale and the five-note variant, the pentatonic scale. A western scale has 12 half steps, and to visually distinguish all of them using any combinations of markings or lack of markings would require, at a minimum, six elements to represent an octave. While many songs use this much range, recent research indicates that the human eye and brain work together to perceive large numbers of repeating visual elements as a pattern instead of discrete elements. While this pattern perception is believed to kick in at different numbers of elements depending on the person, it generally comes into play when the person is confronted with four or five repeating visual elements. Thus, people cannot count (without intense mental focus) the total number of elements in most chromatic scales. This means that humans have difficulty counting the staff elements for any chromatic scale. Therefore, in contrast to the approach generally taken by chromatic scales, it is desirable to 1) reduce the number of elements represented, and 2) eliminate pattern phenomena in a new graphical scale.

Piano-like staves. Most pianos have wide white keys and thin black keys arranged in a pattern matching the diatonic scale (i.e., white-black-white-black-white-white-black-white-black-white-black-white). The white keys refer to the "natural" notes (i.e., C, D, E, F, G, A, and B). And the black keys refer to the sharps and flats (written here with sharps): C♯, D♯, F♯, G♯, A♯. Many proposed notation systems draw each of the black keys as a line in a staff, known as "piano-like staves." As with chromatic scales, there are simply too many elements to count and most of the values are not used. Piano-like staves make their most common appearance in "sequencer" applications, for instance MIDI editors.

WYSIWYP. On Apr. 11, 2019, Stuart Byrom disclosed "WYSIWYP" (i.e., what you see is what you play) notation to the Music Notation Modernization Association ("MNMA"). At first, WYSIWYP may appear to use lines for the half steps in the scale and blank spaces for the whole steps. However, there is no visual marking delineating the boundary of one whole-step space with an adjacent whole-step space. So when drawn in the published examples, WYSIWYP actually uses spaces of two different sizes, which then represent two or three whole steps. Furthermore, in the published examples, the three-step spaces were only 1.375 times as tall as the two-step spaces, meaning they did not proportionately represent three steps equally as compared to the two-step spaces. The disclosure's explicit references to ClairNote (a chromatic notation which uses lines and spaces for half notes and omits lines uncommon to the diatonic scale) as prior art suggest its pitch coordinates may instead be aligned to another, unseen, geometric construction. WYSIWYP is also redundant, using both numbered octaves and large gothic letters to represent clefs. WYSIWYP also interferes with artistic expression by preselecting colors for the C and F lines.

All of the attempts at music notation described above have failed to communicate rhythm pitch and lyrics to someone who wants to sing along but has no formal music training. They expect the user to receive formal education in the system's use. The idea that the user will have to practice for a very long time (usually years, if not months) has been beaten into musicians, especially ones who get far enough to philosophize about alternate notations. As a general matter, only games use musical notations designed to be learned without any formal training. Yet the developers of such games have no intention of trying to make it easy on users. The whole point of a game is to make it difficult enough to read the notation that most people usually only partially succeed without intense focus.

Other efforts to improve music notation have attempted to make a notation suitable for both instruments and human voice. With the exception of certain fretless stringed instruments, all non-human voice instruments have a physical location (e.g., a key or a slide position) where they must be touched or positioned such that they produce the right tone. In other words, once tuned, instruments produce the pitch perfectly when touched in the correct location. Of course, in the case of harmonics, a physical location can produce one of several tones and it is up to the performer to apply more elusive techniques, such as tightening or loosening the embouchure to turn a third slide position on a trombone from an E♭ to an A♭.

Guitar tablature is an instrument-specific notation readily learnable by novices but applicable only to one kind of instrument, fretted strings. Despite the fact that it cannot even represent rhythm, guitar tablature is probably the most widespread alternate music notation. However, guitar tablature, or any other instrument-specific notation, does not translate well to the human voice, because the human voice has no visible positions for any of its pitches. The human voice does, however, come standard with an attached human ear and brain. Together, they can detect changes in the scale of a musical composition and automatically re-tune the notes to fit with implied key signature changes to match the performance of others. This makes the human voice "relative" and only a very few people (even amongst musicians) are capable of detecting or generating "perfect pitch."

To guide designers in their goal of designing a single music notation for all instruments, including the human voice, the MNMA created a set of "guidelines" for new notations, including the following:

1. The notation is convenient for a human writer to express musical ideas and a human performer to recreate such musical ideas, as contrasted with machine or other approaches to notation.
2. The notation can be written conveniently and quickly with nothing more than a writing tool, such as a pencil, without the absolute necessity of a ruler or other drawing aids, or specially prepared paper. In other words, a plain piece of paper and pencil, or a chalkboard and chalk, for example, should be sufficient for quickly notating music in the notation if desired.
3. The notation is independent of all musical instruments for intelligibility, so that the notation is readily adaptable to all instruments, including the human voice.
4. The notation can express music of all reasonable degrees of complexity, not only simple music.
7. The notation is writable using only two colors, black and white, or any similar combination, without shading or tinting, for example, black pencil on white paper or white chalk on black chalk board. Such so-called monochrome systems offer the maximum in simplicity and convenience, and is considered essential, especially since many people have some degree of color-blindness.
8. The notation possesses a fully proportional pitch coordinate, where each of the twelve common pitches is spaced in a graphic manner, so that progressively larger pitch intervals have progressively larger spacing on the coordinate, providing a visual representation of each interval that is exactly proportional to its actual sound.
14. The notation is adaptable to a variety of microtonal systems.

Thomas S. Reed, *Directory of Music Notation Proposals*, (Notation Research Press: Kirksville, Mo., 1997), p. 6-1, 6-2.

Many of these rules hinder the development of a system well-suited to certain purposes, such as congregational singing, karaoke, or even choir singing. For instance, MNMA Rules 1, 2, and 7 teach against blending a music notation with artwork. However, this can be useful for various purposes, including setting the mood for a group of people or increasing production value in karaoke.

Moreover, Rule 8 constrains compliant systems to chromatic notations, which carry the disadvantages described above. Rules 4 and 14, though perhaps laudable goals, require too much complexity to be fundamental design requirements.

The MNMA demonstrated its belief that each of the published criteria are necessary. While it did publish and review some notations which did not meet all these criteria, including the "Puntun" notation by Michael Lascober, any notations that did not meet all the criteria did not reach the final round of review.

MIDI and Software Developers. Most computer programmers who create a graphical editor for music are doing so for editing MIDI. They have typically utilized a chromatic notation and so generally write their apps to represent all notes the same way, which is significantly easier for a computer program to do. Thus, these apps share the disadvantages common to chromatic notations. Moreover, up until very recently, computers have been poor at synthesizing the human voice, and so lyrics in MIDI-editing apps have been the exception, not the rule.

As a result, a need exists for a music notation that is easier for musicians to read more readily. A need also exists for a music notation that allows people who have no musical training to follow along when singing.

SUMMARY

Examples described herein include methods of music notation that are easier for musicians to read more readily while performing and for untrained audience members to follow along when singing, as well as computer-implemented devices including an electronic display device for display such music notations.

A method for visually representing music may provide a visual scale representing a range of an auditory scale of a portion of a musical composition. In one aspect, the range may span at least four and a half steps. The visual scale may comprise a plurality of whole-step segments each representing one whole step in the auditory scale. Each whole-step segment may be approximately a first height. The visual scale may also comprise one or more half-step segments each representing one half step in the auditory scale. Each half-step segment may be approximately a second height. A first ratio representing the first height divided by the second height may be significantly greater than a second ratio representing the whole step divided by the half step. The first ratio may be at least two times the second ratio. In another aspect, the first ratio may be between two to fifteen times the second ratio.

In one aspect, adjacent whole-step segments or half-step segments are colored differently. In another aspect, a sequence of the plurality of whole-step segments and the one or more half-step segments in the range are alternating colors. In one aspect, the whole-step segments have opacity between 25% to 50%. In another aspect, the visual scale provides an indicator associated with a note that is not in the auditory scale of the portion of the musical composition.

In one aspect, the visual scale comprises one or more measure lines and beat ticks. The visual scale may omit the beat tick for beats associated with one of the measure lines. Each beat tick may have a color that contrasts with the whole-step segment over which it is located.

The visual scale may comprise one or more note indicators that each represent a note in the musical composition, wherein each note indicator may be center-aligned with a center of the whole-step segment or half-step segment corresponding to the note represented by the note indicator. The note indicators may contain lyrics. In one aspect, the second height of the half-step segments may be within fifty percent of the average line-thickness of a font predetermined for the lyrics. The lyrics may also be in a font having a cap-height that is equal to the first height of the whole-step segments.

In another aspect, a computer-implemented device for visually representing music is provided. The computer-implemented device may include an electronic display device for displaying a visual scale representing a range of an auditory scale of a portion of a musical composition, wherein the range spans at least four and a half steps. The visual scale may comprise a plurality of whole-step segments each representing one whole step in the auditory scale, wherein a height of each whole-step segment is approximately a first height. The visual scale may also comprise one or more half-step segments each representing one half step in the auditory scale, wherein a height of each half-step segment is approximately a second height. A first ratio representing the first height divided by the second height may be significantly greater than a second ratio representing the whole step divided by the half step.

Both the foregoing general description and the following detailed description are exemplary and explanatory only.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Directional terms are used in the following description for purposes of providing relative reference only and are not intended to suggest any limitations on how any article is to be positioned during use or relative to an environment. Further, while the examples are sometimes described in connection with printed or written musical notation (e.g., sheet music), the examples may also be used with other forms of music notation, such as, for example, electronically displayed music notation. Displays referred to herein may be visual displays, whether printed, drawn, electronic, or other computer-generated display. For example, several types of music composition software programs are known in the art and commercially available for users wishing to write music notation using a computer. Similarly, several types of presentation software are known in the art. The exemplary music notations described herein could be used in conjunction with such systems for generating computer displays of music notation. Moreover, the examples described herein may be used with other types of display, such as a tactile display of Braille music notation.

Methods and systems of music notation for visually representing music are provided that include a visual scale representing a range of an auditory scale of a portion of a musical composition spanning at least four and a half steps. The visual scale may comprise a plurality of whole-step segments each representing one whole step in the auditory scale. Each whole-step segment may be approximately a first height. The visual scale may also comprise one or more half-step segments each representing one half step in the auditory scale. Each half-step segment may be approximately a second height. A first ratio representing the first height divided by the second height may be significantly greater than a second ratio representing the whole step divided by the half step. This may be referred to as a disproportionate correlated scale.

Figure 1:
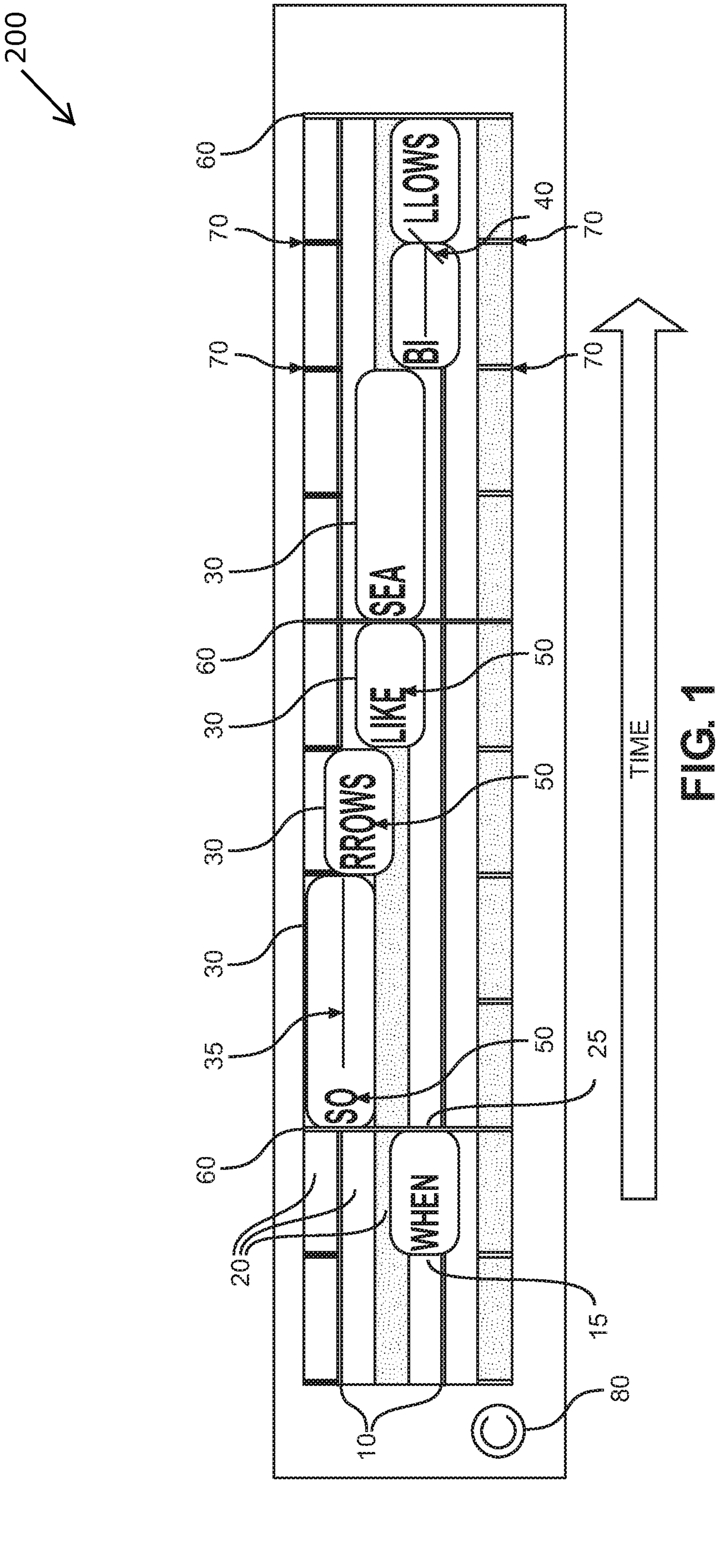
FIG. 1 shows an example music notation using a disproportionate correlated scale.

FIG. 1 shows an example layout 200 of a music notation using a disproportionate correlated scale. As shown in FIG. 1, the disproportionate correlated scale may comprise a plurality of whole-step segments 20 and half-step segments 10 representing sequential intervals in the aural musical scale. Each whole-step segment 20 represents a particular whole step in the selected musical scale, while each half-step segment 10 represents a particular half step.

In the example shown in FIG. 1, each whole-step segment 20 is approximately the same height. Each half-step segment 10 is approximately the same height. The ratio of the height of the whole-step segments divided by the height of the half-step segments is significantly greater than the ratio representing the whole step divided by the half step. For this reason, the music notation shown in FIG. 1 is referred to as "disproportionate." The scale is referred to as "correlated" because the order of half-step segments 10 and whole-step segments 20 is correlated to the half steps and whole steps of the selected musical scale.

In one aspect, the height of the half-step segments 10 may be the minimum thickness that can be distinguished by an expected viewer, while the height of the whole-step segments 20 may be significantly greater than the height of the half-step segments 20. For example, the height of the whole-step segments 20 may be between four to thirty times the height of the half-step segments 10. In one aspect, the height of the whole-step segments 20 may be four times the height of the half-step segments 10.

In one aspect, a first ratio representing the height of the whole-step segments 20 divided by the height of the half-step segments 10 is significantly greater than a second ratio representing the whole step divided by the half step. In another aspect, the first ratio may be at least two times the second ratio. In yet another aspect, the first ratio may be between two times and fifteen times the second ratio.

If lyrics are present, the font and size are usually selected such that the height of the half-step segments is approximately the same (e.g., within fifty percent) as the line-thickness (i.e., line weight) of the font, and the height of the whole-step segments is sized based on typographic properties of the font, such as the x-height or cap-height. For screen-visible fonts (i.e., fonts intended for use in a pixel grid rather than print), this generally results in the height of the whole-step segments being at least five times the height of the half-step segments and sometimes as much as 25 times.

When drawing in "perfect pitch" mode, the visual scale may correlate to the diatonic intervals of the C-major aural scale. When drawing in "relative pitch" mode, the visual scale may correlate to the intervals of an aural scale in the selected composition. When the aural scale properly contains augmented intervals, the augmented interval may be split into a half step and a whole step for representation in the notation.

As shown in FIG. 1, when drawn in relative mode, the visual scale must be marked with an "anchor" 80 providing the perfect pitch name of at least one of the notes in the scale. In FIG. 1, for example, the anchor 80 comprises the letter "C" in front of a circle, located outside the leading edge of the scale. In this example, a trained musician would conclude that the notes in the aural scale represented by whole-step and half-step visible segments from bottom to top are C, D, E♭, F, G, A, B♭, C. The scale's range may be extended to include the note for the anchor. Instead of always marking C, the anchor may mark the key note of the scale. In FIG. 1, that would be the B♭ half-step segment.

The range of whole-step segments 20 and half-step segments 10 represented on layout 200 may be enough to include the highest and lowest note to be performed in its represented time range. Most musical compositions use a single aural scale for their entire duration. Correspondingly, the notation may use a similar sequence of half-step segments and whole-step segments for all layouts. In that case, the notation may include in each layout all the whole-step segments and half-step segments spanning the range of the highest and lowest notes to be performed in the entire composition. However, some songs have sections with different scales. In such cases, the notation may be adapted for each section, laying out different selections of whole- and half-step segments to match the aural scale of each section, and spanning intervals of high and low notes for that section alone. It is not necessary for a scale change to result in a new layout, however.

Referring again to FIG. 1, notes may be visually represented by indicators such as note bubbles 30. In one aspect, bubbles 30 are generally rectangular, though one of ordinary skill in the art will recognize that notes may be indicated in other ways. Bubbles 30 may also be stylized in various ways, such as by using chamfered corners or rounded corners. Corner truncation may assist users in noticing the beginning and ending of successive identically-pitched notes. Corner truncation may also draw attention to the visual scale, which is otherwise partially obscured by the note bubbles. Note bubbles 30 may be drawn with their vertical center aligned with the vertical center of the half-step segment 10 or whole-step segment 20 corresponding to that note.

Figure 2A:
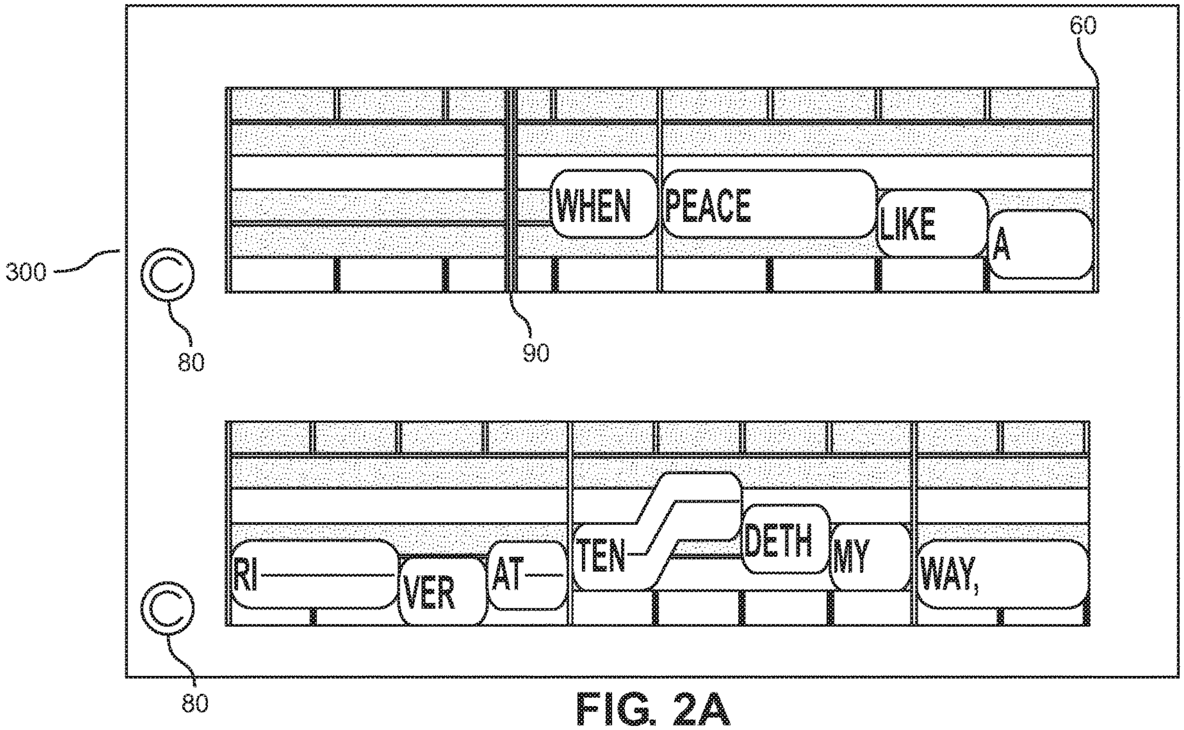
FIGS. 2A-2D show an electronic display device displaying a sequence of layouts of a music notation using a disproportionate correlated scale presented on a display screen.

A note bubble 30 may include a hyphenation line 35 to indicate that the text is a syllable in a word that continues in another note. For example, in FIG. 1, hyphenation line 35 indicates that the syllable "SO" is part of the word "sorrows." The second syllable "RROWS" is included in the subsequent note bubble 30. Hyphenation lines may also be used when indicating a melisma (i.e., a group of notes sung to one syllable of text). In such cases, the note bubble 30 and hyphenation line 35 may be skewed onto another half-step segment 10 or whole-step segment 20. For example, the syllable "TEN" in FIG. 2A is a melisma.

In one aspect, all note bubbles in a given layout have the same bubble height. The bubble height may be, for example, at least as thick as the height of the whole-step segments. If lyrics 50 are included in the layout, the bubble height may be sufficient to encompass lyrical text of sufficient size to be readable by the intended viewers.

In some instances, a particular composition presented in a layout may include a pitch that is not in the composition's scale. As shown in FIG. 1, that pitch may be drawn a half-step up with a slash "/" 40 drawn over the leading edge of the corresponding note bubble 30 (though another symbol or indicator could be used).

Time may advance forward either from left to right or right to left, with the edge corresponding to the earlier time called the "leading" edge, and the opposite edge called the "trailing" edge. When lyrics are present, time would move forward in the same direction as the lyrics. When lyrics are not present, time may preferably move in the direction of the language predominant in the intended audience. However, an apparatus (such as an appropriately programmed computer) for displaying the music notation of FIG. 1 may be configured to specify that time move in any direction.

Rhythm may be indicated by the horizontal placement of a leading edge 15 and a trailing edge 25 of note bubbles 30 relative to each other, as well as by measure lines 60 and beat ticks 70. In one embodiment, measure lines 60 and beat ticks 70 are drawn behind (or underneath) the note bubbles but in front of (or superimposed on) the visual scale. Measure lines 60 may be vertical lines drawn from the bottom to the top of the visual scale. It is possible that a particular layout could include multiple parts drawn with multiple scales. In such a case, a single measure line 60 could extend from the bottom of the lower-most scale to the top of the upper-most scale. Measure lines 60 may be drawn at the beginning of the first beat of a measure.

For other beats in the measure, beat ticks 70 may be drawn instead. In one aspect, a beat tick 70 is a short vertical line. For example, the width of beat tick 70 may be equal to the height of a half-step segment 10. Beat ticks 70 may be drawn over the lower-most and upper-most whole-step segments 20 in a scale. Drawing the beat ticks at the top and bottom minimizes the number of ticks, while helping ensure that one of the two ticks for each beat is visible regardless of the pitch of any one note bubble.

To represent rhythm effectively, the note bubble leading edges 15 and trailing edges 25 and measure lines 60 and beat ticks 70 may be placed such that the relative widths and spacing of note bubbles generally maintains a single width-per-time ratio across a given layout, such as layout 200 in FIG. 1. However, this ratio may, and in practice often will, change from one layout to another. Furthermore, in some cases, the width-per-time ratio may change within a layout.

This is illustrated in FIG. 2A. FIGS. 2A-2D show an electronic display device 300 displaying a sequence of layouts of a music notation using a disproportionate correlated scale presented on a display screen. FIG. 2A contains two layouts, and the layouts pictured in FIG. 2A have a different width-per-time ratio. Electronic display device 300 may be any number of devices known in the art, including without limitation televisions, computer displays, projector/projection screens, LED screens, and the like.

Figure 3A:
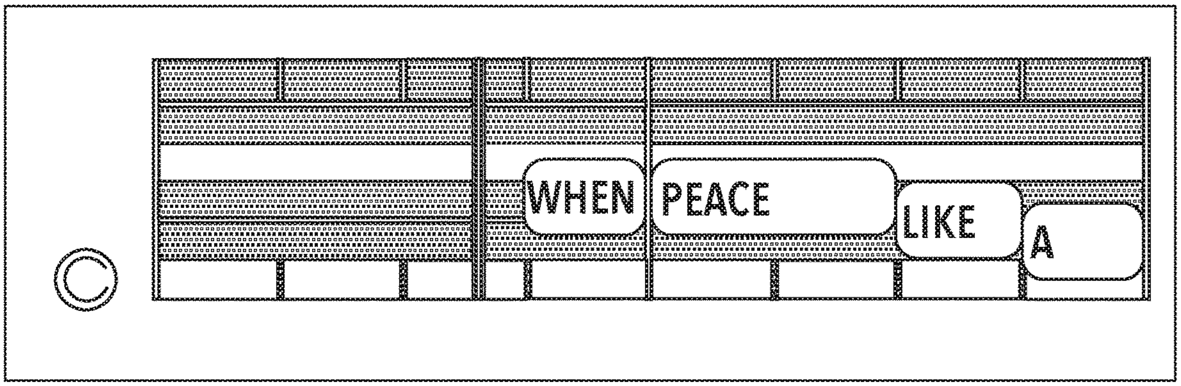
FIG. 3A shows an example music notation using a disproportionate correlated scale.
Figure 3B:
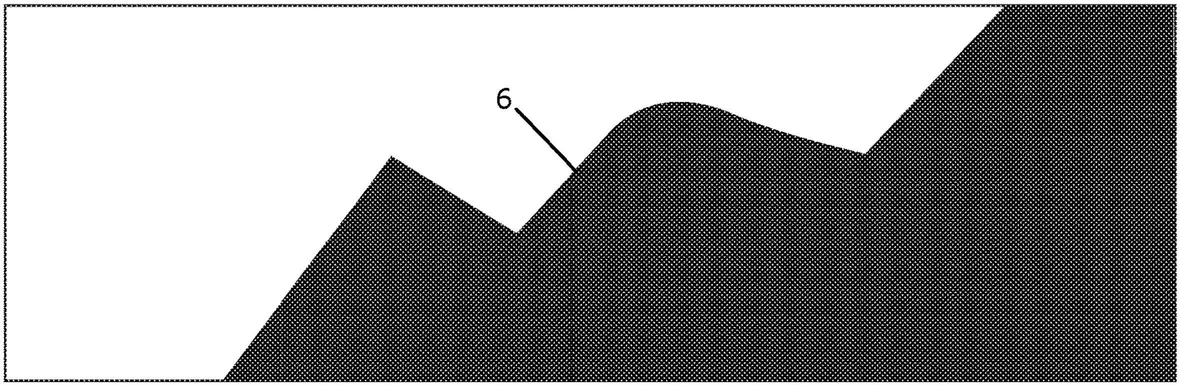
FIG. 3B shows an example background for display behind the music notation of FIG. 3A.
Figure 3C:
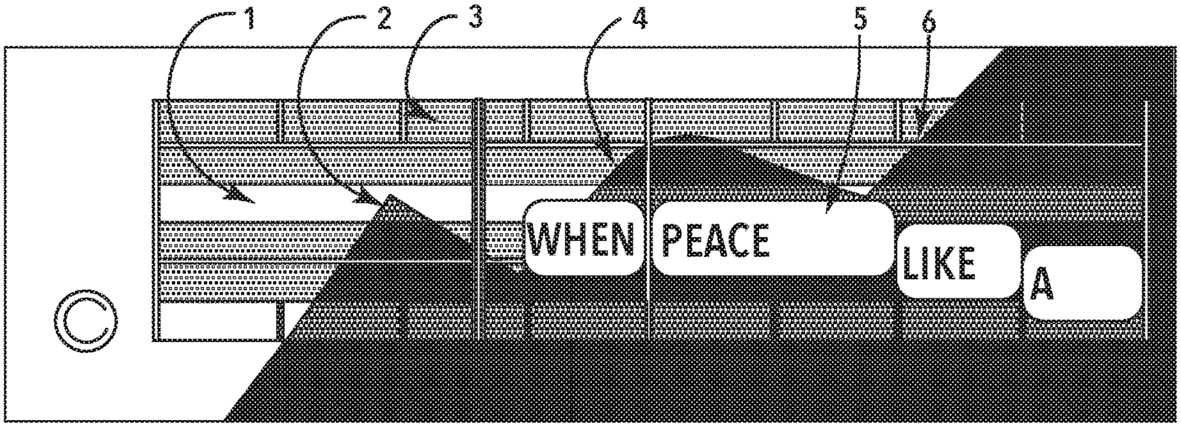
FIG. 3C shows the notation of FIG. 3A on top of the background of FIG. 3B.

In some aspects, it is desirable to display a music notation over a background, such as background artwork. For example, FIG. 3A shows a music notation using a disproportionate correlated scale. FIG. 3B shows a background that may be shown underneath the music notation of FIG. 3A. FIG. 3C shows the music notation of FIG. 3A overlaid on the background shown in FIG. 3B.

When the music notation is used with a background as in exemplary FIG. 3C, the whole-step segments 20 may be drawn with significant transparency (e.g., 50% to 75%). While note bubbles do not require transparency, a slight transparency (e.g., 95% opacity) may improve the look-and-feel of the layout. Similarly, measure lines 60 and beat ticks 70 may be drawn without transparency, but a slight transparency helps prevent them from dominating the visual appearance of the scale. In one aspect, scale lines may be drawn with approximately the same transparency as the measure lines.

To provide internal contrast, the sequence of half-step segments 10 and whole-step segments 20 may be drawn with alternating colors. For example, two colors may be selected, with one being assigned to measure lines. The lower-most half-step segment 10 or whole-step segment 20 in the scale may also be drawn in this color. Each successive half-step segment 10 or whole-step segment 20 may be given the alternate color from the one below it. In one aspect, beat ticks 70 receive the opposite color of the whole-step segment 20 over which they are drawn. Adjacent whole-step segments 20 need not have abrupt color changes at their junction. For example, the junction between whole-step segments 20 may be rendered as a gradient of color change extending over a particular region. In one aspect, that region may be no more than twice as thick as the height of a half-step segment 10.

Note bubbles 30 may have a color selected to provide contrast with the scale and, where applicable, coordinate with the background artwork. If lyrics are present, their color may be selected to provide contrast with the note bubble colors so that the lyrics are easily legible.

As illustrated in FIGS. 2A-2D, during live playback of a display showing a music notation using a disproportionate correlated scale, a cursor 90 may move across the layout, always positioned at the current time. In one aspect, cursor 90 may comprise a vertical line of the same color as the lyrics and two adjacent lines of the same color as the note bubble (for contrast to aid visibility). Due to the constant width-per-time-ratio of the notation, this means cursor 90 moves at a constant speed for a particular layout. Cursor 90 may also be drawn before the performance of the layout begins, as a lead-in. Cursor may be aligned at its top and bottom with the top and bottom of any measure lines 60, such that it spans all simultaneous scales. Cursor 90 may be drawn superimposed over the scale measure lines 60 and beat ticks 70, but behind (or underneath) any note bubbles 30. Cursor 90 may be omitted if musicians have difficulty performing in-sync with the notation.

Figure 2B:
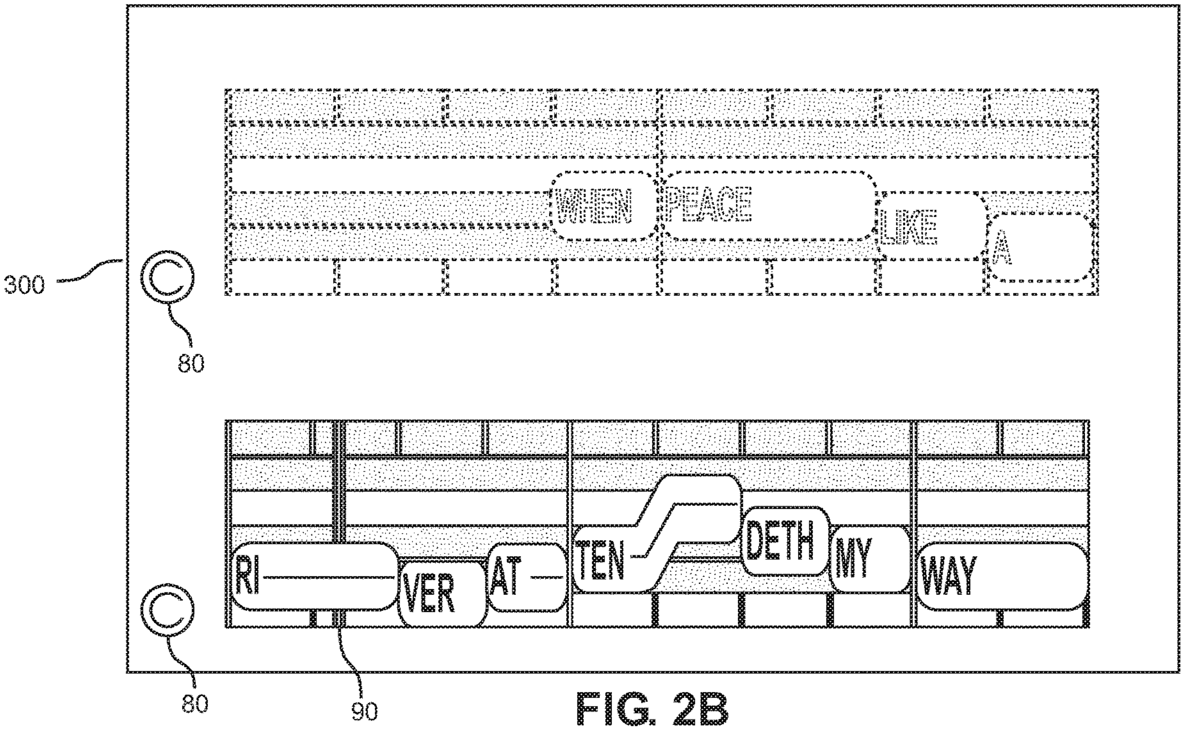
Figure 2C:
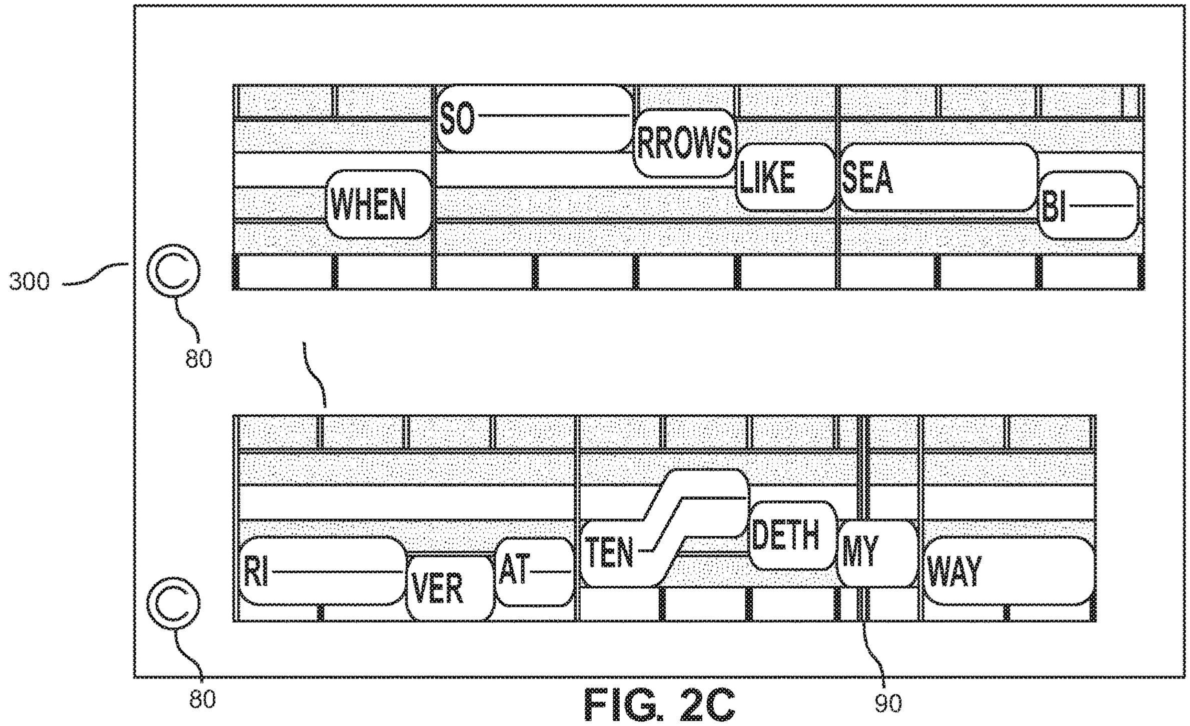
Figure 2D:
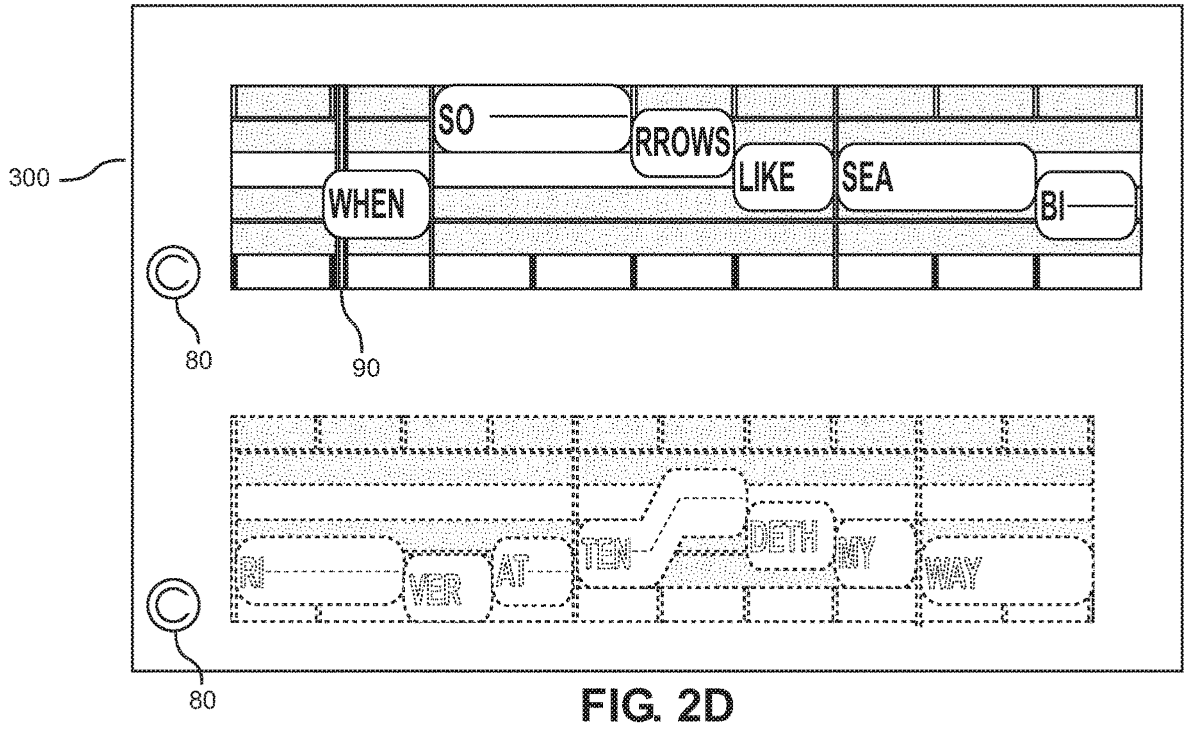

In one aspect, during live performance, when the time of a particular layout has expired, it may be removed immediately. In another aspect, an expired layout may be faded or blurred until invisible or otherwise removed gradually using visual effects known in the art. FIG. 2B shows two layouts, with the top layout shown in mid-fade. Similarly, FIG. 2D shows two layouts, with the bottom layout shown in mid-fade. In an "all or nothing" moment, all of the lyrics or notes on the display must be removed and a new slide must be at least partially displayed before the viewer knows what will happen next. As demonstrated in FIG. 2A-2D, the all-or-nothing moment is avoided entirely by continually replacing a completed layout with a future layout. By limiting the drawing to two simultaneous layouts, the indication of which layout is to be used becomes obvious to the inexperienced viewer because there is only one choice following the completion of each layout.

Other examples of the disclosure will be apparent to those skilled in the art from consideration of the specification and practice of the examples disclosed herein. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for visually representing music, the method comprising, the steps of:

providing a visual scale representing a range of an auditory scale of a portion of a musical composition, wherein the range spans at least four and a half steps, said visual scale comprising:

a plurality of whole-step segments each representing one whole step in the auditory scale, wherein a height of each whole-step segment is approximately a first height, and one or more half-step segments each representing one half step in the auditory scale, wherein a height of each half-step segment is approximately a second height; and wherein a first ratio representing the first height divided by the second height is at least two times greater than a second ratio representing the whole step divided by the half step.

2. The method of claim 1, wherein the first ratio is between two to fifteen times the second ratio.

3. The method of claim 1, wherein adjacent whole-step or half-step segments are differently colored.

4. The method of claim 1, wherein a sequence of the plurality of whole-step segments and the one or more half-step segments in the range are alternating colors.

5. The method of claim 1, wherein the visual scale provides an indicator associated with a note that is not in the auditory scale of the portion of the musical composition.

6. The method of claim 1, wherein the whole-step segments have opacity between 25% to 50%.

7. The method of claim 1, wherein the visual scale comprises one or more measure lines and beat ticks.

8. The method of claim 7, wherein the visual scale does not include a beat tick at a position at which a measure line is located.

9. The method of claim 7, wherein each beat tick has a color that contrasts with the whole-step segment over which it is located.

10. The method of claim 1, wherein the visual scale further comprises one more note indicators that each represent a note in the musical composition, wherein each note indicator is center-aligned with a center of the whole-step segment or half-step segment corresponding to the note represented by the note indicator.

11. The method of claim 10, wherein one or more of the note indicators contain lyrics.

12. The method of claim 11, wherein the second height of the half-step segments is within fifty percent of the average line-thickness of a font predetermined for the lyrics.

13. The method of claim 11, wherein the lyrics are in a font having a cap-height that is equal to the first height of the whole-step segments.

14. A computer-implemented device for visually representing music, the computer-implemented device comprising:

- a computer programmed to carry out displaying on an electronic display device a visual scale representing a range of an auditory scale of a portion of a musical composition, where the range spans at least four and a half steps, said visual scale comprising:
  - a plurality of whole-step segments each representing one whole step in the auditory scale, wherein a height of each whole-step segment is approximately a first height, and
  - one or more half-step segments each representing one half step in the auditor scale, wherein a height of each half-step segment is approximately a second height; and wherein a first ratio representing the first height divided by the second height is at least two times greater than a second ratio representing the whole step divided by the half step.

15. The computer-implemented device of claim 14, wherein the first ratio is between two to fifteen times the second ratio.

16. The system of claim 14, wherein the plurality of whole-step segments and one or more half-step segments are colored so as to distinguish between adjacent segments.

17. The system of claim 14, wherein the visual scale further comprises one or one note indicators that each represent a note in the musical composition, wherein each note indicator is center-aligned with a center of the whole-step segment or half-step segment corresponding to the note represented by the note indicator.

18. The system of claim 17, wherein one or more of the note indicators contain lyrics, wherein the lyrics are in a font having a cap-height that is equal to the first height of the whole-step segments and the second height of the half-step segments is within fifty percent of the average line-thickness of the font.

* * * * *